H. W. BALTZ, Sr.
Car-Starter.
No. 162,339.  Patented April 20, 1875.
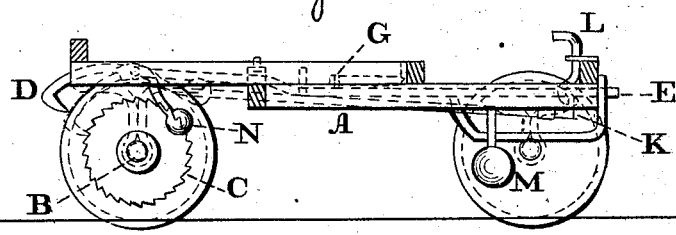
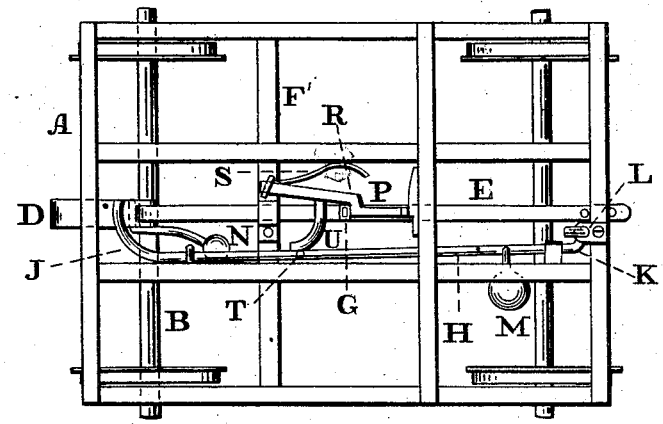
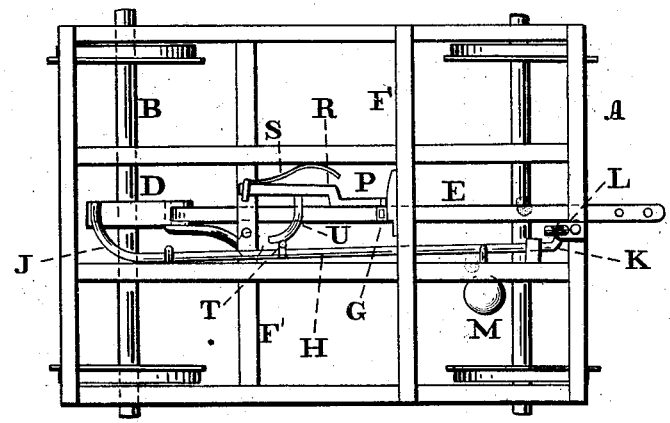
Witnesses:
L. F. Brous
A. P. Grant
Inventor:
Henry W. Baltz, Sr.
by John A. Wiedersheim
Att'y.

UNITED STATES PATENT OFFICE.

HENRY W. BALTZ, SR., OF PHILADELPHIA, PENNSYLVANIA.

IMPROVEMENT IN CAR-STARTERS.

Specification forming part of Letters Patent No. 162,339, dated April 20, 1875; application filed March 30, 1875.

*To all whom it may concern:*

Be it known that I, HENRY W. BALTZ, Sr., of the city and county of Philadelphia, and State of Pennsylvania, have invented a new and useful Improvement in Car-Starters; and I do hereby declare the following to be a clear and exact description of the nature thereof, sufficient to enable others skilled in the art to which my invention appertains to fully understand, make, and use the same, reference being had to the accompanying drawings making a part of this specification, in which—

Figure 1 is a side elevation of a car-truck having my invention applied thereto. Figs. 2 and 3 are top views thereof, showing different positions of the parts.

Similar letters of reference indicate corresponding parts in the several figures.

My invention relates to a car-starter, wherein a sliding bar connected to the tongue of the car or traces of the animal carries a pawl, which is adapted to engage with a ratchet on the axle of the wheels, or on one or both wheels; and it consists in means for locking the sliding bar and receiving the strain thereof. It also consists in an elastic buffer on the sliding bar, for limiting the forward movement of said bar, and easing the pressure or strain thereon. It also consists of an oscillating rod for unlocking the sliding bar, and causing the engagement of the pawl with the ratchet.

Referring to the drawings, A represents a car-truck, which may be of well-known form and construction. On the axle B there is keyed, or otherwise secured, a ratchet, C, with which is adapted to engage a pawl, D, which projects rearward, and is jointed to a longitudinally-extending sliding bar, E, whose forward end is to be attached to the tongue or shaft of the car, or the traces of the harness of the horses which draw the car, said bar being fitted and guided in suitable transverse beams F F' of the truck. G represents a rubber-covered buffer, which is secured to and rises from the bar E at such a point that when the animals start, and the bar is consequently drawn forward, said buffer will strike the beam F, prevent forward movement of the bar, and receive the strain thereof, the rubber covering easing the pressure or strain on the beam F. It will be seen that when the pawl D is in contact with one of the ratchet-teeth behind the axle B, and the bar E moves forward, the ratchet will be rotated, and consequently cause a rotation of the wheels of the car, whereby the car is started. H represents an oscillating rod, which extends longitudinally or parallel with the bar E, and is mounted in suitable bearings on the truck A. The rear end of this rod H is bent or extended transversely, or formed with a transverse arm, J, so as to extend over the pawl D, and the front end is likewise bent or extended transversely, or formed with a crank, K, and connected to a treadle or lever, L, which is in convenient reach of the driver, so that the depression of said treadle will impart rotary motion to the rod H, and conveniently depress the pawl D, whereby the latter will be forced down on and caused to engage with the ratchet C, as a movement preparatory to the starting of the car, after which the driver lets go the treadle L, and the rod H resumes its normal position, owing to a counterpoise, M, secured to the rod. When the bar has moved sufficiently forward, and the car is started, the pawl will become disengaged or automatically elevate itself from the ratchet by the action of a weighted arm or counterpoise, N, secured to the axial portion of the pawl, and projecting toward the front of the car. The car moves forward, and the drawing strain on the rod, caused by the draft of the animals, is taken up by the buffer G, which bears solidly against the beam F of the truck, as has been stated. To the beam F' of the truck there is hinged a locking-bar, P, which extends longitudinally and horizontally, and its free end projects toward the front of the car. On the bar P there is formed a transversely-extending shoulder, R, which occupies such position that when the sliding bar E is back or in to its full extent, the shoulder R will be in contact with the buffer G, and the front end of the bar P with the transverse beam, so that when it is not wished to use the starting mechanism, as in cases of going down grade, empty or slightly-loaded cars, or otherwise, the strain on the sliding bar E will be transmitted by the buffer G to the shoulder R of the bar P, and from the latter to the beam F of the truck. The bar P will be held in position by means of a spring, S, bearing against said bar, but will be forced therefrom by the action of the oscillating rod H, which has secured to it an arm, T, which projects toward the bar P, in juxtaposition to an arm, U, secured to the bar P, and projecting therefrom toward the arm T, so that the rotation of the rod H forces the arm T against the arm V, and consequently moves the shoulder of the bar P from the buffer G of the sliding bar E, whereby the latter may be drawn forward, in order to cause the pawl D to engage with the ratchet C and start the car, in the manner before stated. The sliding bar E will be returned or moved in by means of springs or weights, an arrangement in an inclined position, action of the driver, stoppage of the animals, or other means, as is well known. When the car is going up grade, and liable to back, the pawl may be engaged with the ratchet E, and act as a brake to the wheels.

Having thus described my invention, what I claim as new, and desire to secure by Letters Patent, is—

1. The locking-bar P, in combination with the sliding bar E, pawl D, and ratchet C, substantially as and for the purpose set forth.

2. The elastic buffer G, in combination with the sliding bar E and beam F of the truck, substantially as and for the purpose set forth.

3. The oscillating rod H, having transverse arm J, in combination with the hinged pawl D and ratchet C, substantially as and for the purpose set forth.

4. The oscillating rod H, having transverse arm T, in combination with the locking-bar P and sliding bar E, substantially as and for the purpose set forth.

5. The oscillating rod H, having transverse arms J T, in combination with the hinged pawl D and locking-bar P, substantially as and for the purpose set forth.

H. W. BALTZ, Sr.

Witnesses:
 JOHN A. WIEDERSHEIM,
 WM. PERRINS.